Nov. 12, 1963         W. R. POLANIN          3,110,362
HANDBRAKE LINKAGE FOR SELF-CONTAINED BRAKE ARRANGEMENT
Filed Dec. 8, 1960                    2 Sheets-Sheet 1
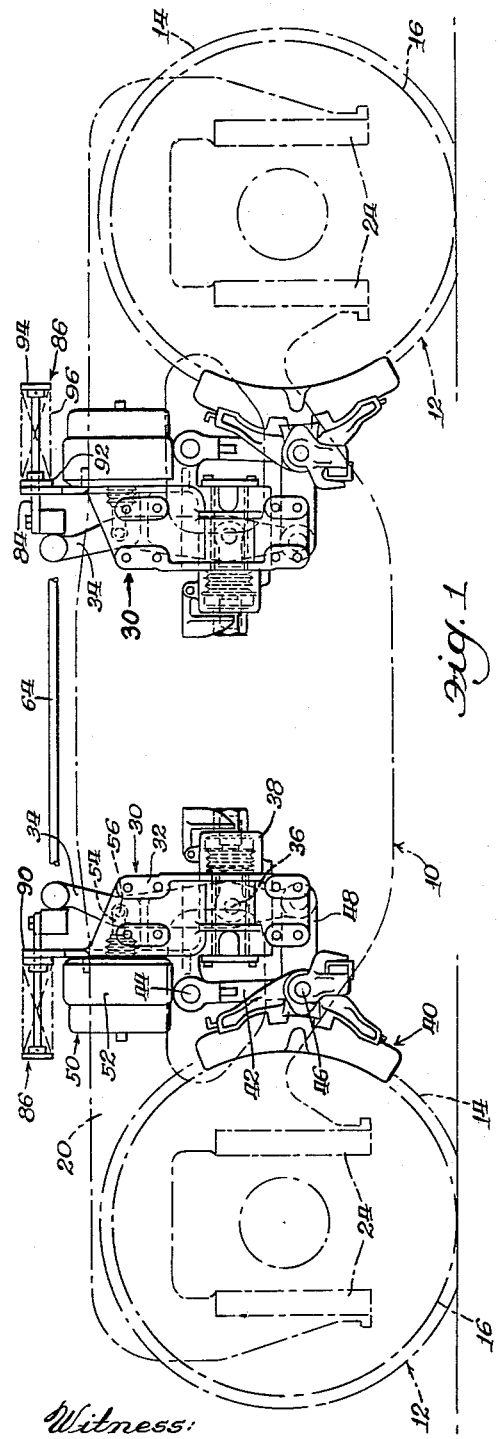
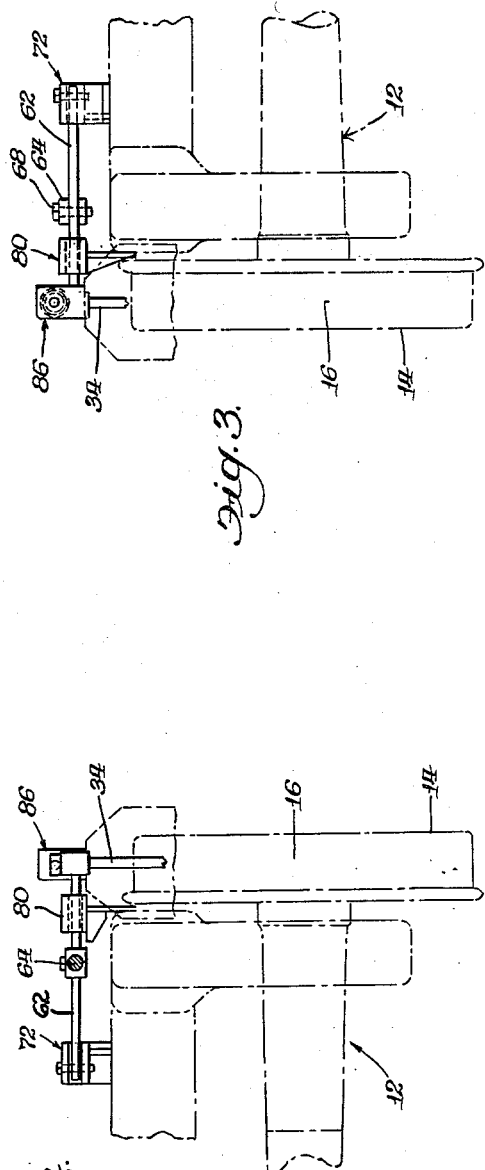
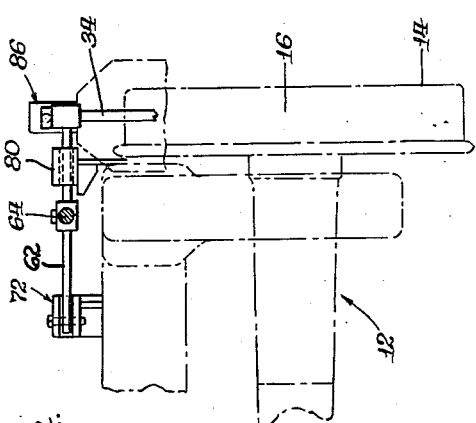
INVENTOR.
Walter R. Polanin
BY Walter L. Schlegel, Jr.
Atty.

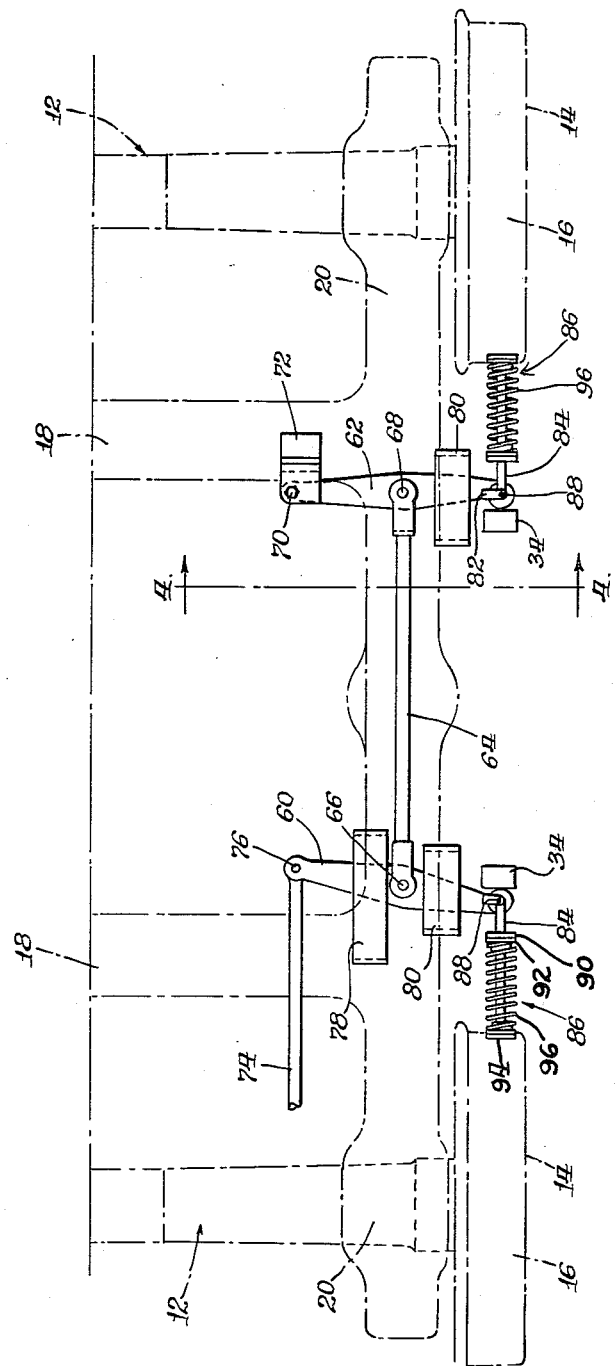

3,110,362
HANDBRAKE LINKAGE FOR SELF-CONTAINED
BRAKE ARRANGEMENT
Walter R. Polanin, Chicago, Ill., assignor to Amsted Industries Incorporated, Chicago, Ill., a corporation of New Jersey
Filed Dec. 8, 1960, Ser. No. 74,515
2 Claims. (Cl. 188—52)

This invention relates to brakes and more particularly to actuating linkage for railway vehicle brakes.

The invention comprehends a hand brake linkage for use with a pair of self-contained brake mechanisms which can be applied as independent units to a railway vehicle truck.

With the advent of the modern self-contained or package brake mechanisms which are applied to trucks of railway vehicles such as railroad cars and rapid transit cars, it is necessary to provide hand brakes as a supplement to the individual power actuating means embodied in these independent brake mechanisms.

It is, therefore, a primary object of this invention to provide a hand brake linkage which is simple in design and construction and which can be readily adapted for use with various types of self-contained brake mechanisms.

A more specific object of the invention is to provide a hand brake linkage comprising live and dead actuating levers interconnected by a connecting link and engaging the brake levers of two independent brake mechanisms.

These and other objects of the invention will be apparent from an examination of the following description and drawings, wherein:

FIGURE 1 is a fragmentary side elevation showing a railway vehicle truck having a brake arrangement embodying features of the invention;

FIGURE 2 is a top plan view of a portion of the structure illustrated in FIGURE 1;

FIGURE 3 is a fragmentary end elevation of the structure illustrated in FIGURE 1, as seen from the right; and FIGURE 4 is a fragmentary vertical section taken on line 4—4 of FIGURE 2.

Referring now to the drawings for a better understanding of the invention, a brake arrangement embodying features of the invention is shown as applied to a railway vehicle truck having a frame, indicated generally at 10, supported on a pair of spaced wheel and axle assemblies, indicated generally at 12, each of which includes a pair of wheels 14—14 presenting a peripheral or tread friction surface 16.

As best seen in FIGURE 2, the frame comprising a pair of transversely spaced side members 20—20 interconnected by a pair of parallel transversely extending integral cross members or transoms 18—18. The side members may be provided at their ends with the usual pedestal jaws 24—24 for receiving conventional journal boxes in which the wheel and axle assemblies are journaled.

A pair of self-contained brake mechanisms 30—30 of the general type disclosed in a co-pending application, Serial No. 751,280, filed July 28, 1958, in the names of Walter R. Polanin and Matthew F. Andrezjewski, issued on October 20, 1961 as Patent No. 3,040,843, are detachably mounted on a side member 20 of the frame 10 adjacent their respective wheel and axle assemblies 12—12.

Each of the brake mechanisms 30 includes a brake frame or brake support 32 which can be detachably mounted on the side member 20 of the truck frame 10 in any desired manner, such as by bolting the support to the frame. A generally vertically extending dead brake lever 34 is carried by the brake support 32 of the brake mechanism and may be fulcrumed intermediate its ends for rotation about a fulcrum pin 36 of a slack adjuster device 38 which is mounted on the brake support 32 in a manner disclosed in the previously mentioned application.

Disposed adjacent the friction surface 16 of each wheel for engagement therewith is a brake shoe assembly 40 carried by the brake support 32 by means of a hanger 42 pivotally connected at its upper and lower ends to the brake support and brake shoe assembly by pins 44 and 46, respectively. The brake shoe assembly 40 is pivotally connected to the lower end of the brake lever by a link 48.

Power actuation of the brake lever 34 is achieved by means of a power device, indicated generally at 50, which is carried by the brake support 32 and includes a power cylinder 52 having extending therefrom a power rod 54, the free end of which is pivotally connected by pin 56 to an upper portion of the brake lever 34.

In order to afford a means for manual actuation of the brake mechanisms there is provided a hand brake linkage which, as best seen in FIGURE 2, includes a pair of generally horizontally disposed transversely extending live and dead actuating levers 60 and 62, respectively. At their outboard ends levers 60 and 62 have abuttable connections with the upper extremities of the left and right hand brake levers, respectively. Intermediate their ends the actuating levers are pivotally interconnected by a pull rod 64 which is pivotally connected by pins 66 and 68 to actuating levers 60 and 62, respectively. At its inboard end dead actuating lever 62 is fulcrumed by pin 70 to a fulcrum bracket 72 which is rigidly secured to the truck frame in any manner, as by welding. The inboard end of the live actuating lever 60 is adapted for connection to a hand brake actuating mechanism, not shown, by means of a pull rod 74 which is pivotally connected at one end by pin 76 to the inboard end of the live actuating lever. Additional support for the actuating levers 60 and 62 is provided by brackets 78 and 80 preferably welded to the frame and adapted to offer sliding support for the horizontal levers.

At their outboard ends the actuating levers are each provided with an offset arm or lip 82 which forms with the lever an opening adapted to receive a spring rod 84 of a brake release device, indicated generally at 86. The end of each rod 84 is pivotally connected to the outboard end of the related actuating lever by a pin 88.

The brake release device 86 is mounted on a bracket 90 which is preferably welded on the upper part of support bracket 32. The devices includes the rod 84, a pair of washers 92 and 94 and a compression spring 96. The washer 94 is rigidly secured to the free end of the rod 84, and the washer 92 is mounted for sliding movement on the rod so as to abuttably engage the bracket 90. The compression spring 96 is sleeved over the rod so as to react between the respective washers and thereby pivot the levers 60—62 away from the brake lever 34 to brake release position upon movement of the rod 74 toward its brake release position.

I claim:

1. In handbrake rigging for a railway car truck having a frame supported upon two wheel and axle assemblies, two brake supports mounted on the frame between said assemblies, brake shoes mounted on said brake supports to frictionally engage their respective assemblies, vertical brake levers pivotally mounted intermediate their ends on said brake supports and having their lower ends connected to said brake shoes, a horizontal dead actuating lever having its inboard end pivotally connected to said frame and its outboard end movable into abutting engagement against the upper end of one of said brake levers, a horizontal live actuating lever slidably mounted on said frame and having its outboard end movable into abutting engagement against the upper end of the other of said brake levers, a link pivotally connected at its ends to the medial portions of said live and dead actuating levers, release spring means engaged between the outboard ends of each of said actuating levers and their respective brake supports, and brake operating means connected to the inboard end of the live actuating lever.

2. A brake rigging according to claim 1 in which each release spring means comprises a helical compression spring seated at one end thereof on a brake support, and a rod extending through an aperture in the brake support and engaging the other end of the spring.

References Cited in the file of this patent

UNITED STATES PATENTS

| 1,191,953 | Drayer | July 25, 1916 |
| 1,998,975 | Baselt | Apr. 23, 1935 |
| 2,033,319 | Baselt | Mar. 10, 1936 |
| 2,260,879 | Williams | Oct. 28, 1941 |
| 2,686,575 | Bunker | Aug. 17, 1954 |
| 2,877,870 | Tack et al. | Mar. 17, 1959 |
| 2,913,071 | Mueller | Nov. 17, 1959 |
| 2,940,553 | Newell et al. | June 14, 1960 |
| 2,940,554 | Cameron | June 14, 1960 |
| 3,009,544 | Maloney et al. | Nov. 21, 1961 |